United States Patent Office 2,999,063
Patented Sept. 5, 1961

2,999,063
WATER-IN-OIL EMULSION DRILLING AND
FRACTURING FLUID
Raymond W. Hoeppel, P.O. Box 5,
Oak View, Calif.
No Drawing. Filed Aug. 13, 1957, Ser. No. 677,850
7 Claims. (Cl. 252—8.5)

This invention relates to drilling or packing fluids. More specifically it relates to water-in-oil emulsions for use in well drilling and for use in fracturing producing horizons to promote oil production.

It has long been recognized that certain oil-producing formations containing appreciable water-hydratable clays, silts or shales are often reduced in permeability to oil by the invasion of aqueous filtrates from water base or oil-in-water emulsion muds. To obviate this, drilling fluids have been used which contain oil in the continuous phase. These usually contain asphaltic bodies to reduce fluid loss and improve suspending properties, and consequently are commonly black colored, relatively thick, and disagreeable to handle. Moreover, such fluids vary widely in viscosity as the temperature is changed, making them difficult to handle in cold climates until they are introduced into the warm bore hole. Such fluids will not tolerate much water, becoming very thick as the water content is increased above 20 to 30 percent. These fluids also are hazardous because of their inflammability.

Recently, to overcome some of these difficulties, water-in-oil emulsion drilling fluids have been introduced. These are prepared from lighter oils and may contain as much as 80 percent water. The principal difficulty with such fluids has been that of producing a tight emulsion that will not invert and that will not tend to lose water to clay bodies encountered in drilling. Another difficulty is the problem of reducing viscosity and fluid loss and at the same time maintaining adequate thixotropy so that weight materials will remain suspended. Another difficulty is the susceptibility of these fluids to impairment by contaminants encountered in drilling, such as cement.

If shales and clays are wetted by the aqueous phase they will tend to form a sludge in the fluid, raising viscosity and extracting costly surfactant ingredients from the system by adsorption processes. Any water lost from the fluid into a producing zone could retard oil permeability. A loose, inadequate emulsion is characterized by the presence of appreciable free water in the filtrate when the fluid is forced through a porous medium, and also by the tendency for its aqueous phase to wet clay fragments. If an emulsion is loose, the danger always exists that it will invert to an oil-in-water type with a filtrate containing dominantly water.

In most fracturing operations, an oil base fracturing fluid is pumped under a high pressure to a potential production zone where it tends to open the formation along natural cleavage lines thus increasing the permeability of the production zone. Such fluids normally do not contain sufficient colloids to produce a low fluid loss when filtered through porous media and consequently much of the fluid leaks away before it reaches the zone which it is desired to fracture, resulting in a reduced pressure and a lessened tendency to produce a satisfactory fracture. Moreover, such fracturing fluids are costly and inflammable.

It is thus seen that a good fracturing fluid should have properties comparable to a good oil base drilling fluid and moreover, should be of low viscosity so that a fast pumping rate may be maintained. It follows that a low viscosity, low fluid loss drilling fluid should be well suited for use in fracturing operations.

One object of my invention therefore, is to provide a stable water-in-oil fracturing fluid having a low viscosity, low fluid loss, low cost and low flammability.

Another object of my invention is to provide a stable water-in-oil emulsion drilling fluid which will withstand contamination from large amounts of water.

Another object is to provide a stable water-in-oil emulsion drilling fluid, which will not cause water wetting of shales or clay bodies it encounters.

Another object is to provide a stable water-in-oil emulsion drilling fluid which is not impaired by commonly encountered contaminants such as cement, salt or gypsum.

An additional object is to provide a stable water-in-oil emulsion drilling fluid that is exceptionally low in viscosity and which can be readily circulated and from which drill cuttings can be easily and quickly removed.

Another object is to provide a stable water-in-oil emulsion drilling fluid that will adequately support high or low density weight material despite its low viscosity.

A still further object is to provide a stable water-in-oil emulsion drilling fluid that is inexpensive, non-inflammable and clean to handle.

Another object is to provide a stable water-in-oil emulsion drilling fluid having low fluid loss properties, with a filtrate that is essentially water free, and which is easily distinguishable from true formation crude oils.

A still further object of my invention is to provide a method of fracturing, drilling or completing a well in which a drilling fluid is circulated comprising a stable water-in-oil emulsion with desirable properties heretofore mentioned.

Another object is to devise a method of treating oil base drilling fluids contaminated by water by the addition of a particular type of a high molecular weight amine.

In general, I accomplish the objects of my invention by producing an emulsion of water in oil, employing a combination of a metallic soap with a high molecular weight amine containing at least one aliphatic chain of 12 or more carbon atoms selected from a class of amido diamines, amido polyamines or heterocyclic amines containing two or more nitrogen atoms in the ring structure. The amine used must have a molecular weight of at least 200.

I have discovered that the combination of this particular class of amine with the metallic soap, when added to a mixture of water in oil will produce an exceptionally stable emulsion, and moreover, the API fluid loss of such an emulsion will be so low, even at high temperature, that fluid loss retarding agents, such as asphalts, are not required. Consequently, the resultant emulsion being free from viscous, blank asphalts, is clean and is of an exceptionally low viscosity. Despite the low viscosity, the fluid will adequately support weight materials such as finely divided barites, ferric oxide or calcium carbonate or other weight materials.

Such fluids are well-suited to drilling and fracturing operations because of their ease of manufacture, ease of circulation, lubricating properties, low inflammability, cleanliness, invulnerability to common solid contaminants encountered in the bore hole, high water tolerance, low fluid loss, wide range of specific gravities, and most important, their quality of protecting clays, shales and other solids they contact from becoming wetted by water.

The special types of high molecular weight amines used are fairly strong bases and are apparently strongly adsorbed at the water-oil interface to produce a tight emulsion and also serve to disperse the soap present. They are apparently not adsorbed from this interface to any great degree by clay or other solids encountered in drilling as very strong basic compounds would be. The weak primary or secondary monamines and many tertiary amines, even though of high molecular weight, are unsatisfactory apparently because of their inability to concentrate satisfactorily at the water-oil interface.

Of the heterocyclic amines, the high molecular weight, tertiary imidazolines have been found to be particularly effective. The structure of one of these imidazolines, 1-hydroxyethyl, 2-heptadecenyl imidazoline, that was found to be useful in this patent appears below:

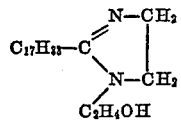

Of the diamines and polyamines, those containing the amido group are very effective. The structure of one of these amido amines, alkyl amido propylene diamine, which has been found to be useful in this invention, is shown below:

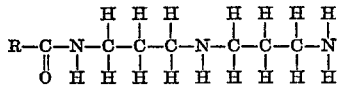

In the above formula, R is a long chain alkyl group containing more than 12 carbon atoms.

The amine concentration may vary from 0.1 to 5 percent or more. As the water content increases, the amine concentration should be increased in order to tighten the emulsion and reduce viscosity. Ordinarily about 1 to 2 percent of the amine is used where the water content is 40 to 50 percent. In some highly weighted fluids containing lesser amounts of water, the addition of as little as 0.1 percent of the special amine will appreciably reduce viscosity and otherwise benefit the fluid.

In contrast to observations with most treating agents, large additions of the amine will have little effect in changing the rheological properties of the emulsion, once the proper amount has been added to reduce the viscosity to the minimum, but such overtreatment will aid in further tightening the emulsion. This is a very desirable feature, as the fluid may be treated with an excess of the amine at one time and thus obviate the inconvenience of constant small additions to maintain desired properties. Overtreatments of 200 to 400 percent will not adversely affect the fluid.

The metallic soap acts as an emulsifier and fluid loss reducer to complement the amine and is an essential component of the emulsion. The soap may be an alkali, alkaline earth or heavy metal type, such as sodium, calcium or iron or aluminum soaps. Combinations of alkali metal or trivalent metal soaps with alkaline earth soaps may be used and are often desirable. Any oil-soluble saponifiable acidic compound may be used to form the soap. Such compounds include the fatty, rosin and naphthenic acids and the phosphatides, such as lecithins.

The soap may be added in solid form, but it is less expensive to produce it in the emulsion fluid by the addition of the oil soluble acidic compound and an inorganic basic compound that is sufficiently soluble to react with the acidic compound to form a soap and also raise the pH of aqueous phase to above 7. Among the useful basic reacting compounds that may be used are sodium hydroxide, sodium silicate, ammonium hydroxide, calcium hydroxide, calcium oxide, magnesium oxide and magnesium carbonate. The basic materials may be added in excess of that required to react with the acidic substance, and this excess is usually desirable in the emulsion, particularly where alkaline earth bases are used.

The soap should be present in amounts varying from 0.2 to 5 percent or more. Some oils contain natural oil soluble acidic materials in sufficient amounts so that the addition of a basic reacting compound alone is sufficient to produce the proper amount of soap, and consequently no acidic compound need be added to the water-in-oil emulsion. In such instances, the only reactants added are the special type of amine and the basic compound.

Some refined oils contain soaps produced by neutralization of the natural inherent acidic substances. With such oils the special amine is the only reactant that is added to produce a stable emulsion.

The soap, which must be oil dispersible, tends to body the fluid and increase viscosity, and often the thixotropy. It also improves the suspending properties of the fluid and aids the amine in tightening the emulsion and reducing fluid loss. The soap content usually may be reduced in high water content systems and increased where the water content is low.

Any type of oil may be used, but, in the interest of cleanliness and rheological considerations, I prefer to use high gravity, light colored refined oils, such as diesel fuel, stove oil, kerosine or gas oils.

The amount of the aqueous phase may vary from 10 to 70 percent of the total fluid volume, depending upon the viscosity of the oil used, the presence or absence of asphaltic bodies in the oil, the amount of weight material or other solids present and the amount and type of anionic surfactants present. As the water content increases, viscosity and thixotrophy increase and in general the fluid loss decreases. Asphalts, paraffins, solids and anionic surfactants also contribute toward viscosity.

The aqueous phase may be pure water, but preferably should contain an electrolyte such as salt or calcium chloride, as the electrolyte serves to tighten the emulsion, repress swelling of clays and shales, and inhibit adsorption of surfactants from the emulsion. Among the electrolytes that may be used are alkali and alkaline earth salts, such as sodium or ammonium chloride or sulfate or calcium or magnesium chloride or sulfate.

A series of tests were made to demonstrate the accomplishments of this invention. In all of the tests, diesel fuel or crude oil was used as the oil phase and fresh water, or water containing salt or calcium chloride, for the water phase. The emulsions were thoroughly agitated, and viscosities and 10 minute gel strengths were determined at 120 deg. F. with the Stormer viscosimeter. The 30 minute fluid losses were determined at 100 p.s.i. pressure in the manner described in API code 29, except that the fluids were maintained at 190 deg. F. instead of at the recommended room temperature, which is a much more severe test for oil base fluids than when made at room temperature. At this higher temperature, which is common in deep holes, the fluid loss is higher and the emulsion tends to break down more readily, resulting in more free water in the filtrate. The amount of water appearing in the filtrate was recorded as a measure of the tightness of the emulsion.

In many of the tests pure water was used for the aqueous phase, rather than the more desirable electrolytic solution, in order to demonstrate the effectiveness of the emulsifiers used under the most adverse conditions. In cases where a small amount of water appeared in the filtrate using water as an aqueous phase, normally no water would have appeared if an electrolyte had been present.

*Example 1*

An emulsion was prepared containing 54 percent diesel fuel and 46 percent water. It was weighted with 40 lb./bbl. of barites in order to demonstrate its suspending properties.

| Fluid Composition | At 120 Deg. F. | | 30 Min. Fluid Loss at 100 p.s.i. and 190 Deg. F. | |
|---|---|---|---|---|
| | Viscosity, cp. | 10 Min. Gel, grams | Total ml. | Free Water, ml. |
| (1) 54% diesel fuel, 46% water, 40 lb./bbl. barites, 0.45% oleic acid and 1.5% lime | 26 | 6 | 13.4 | 4.8 |
| (2) #1 plus 0.45% oleic acid | 33 | 8 | 14.0 | 5.2 |
| (3) #1 plus 0.5% octadecyl amine | 16 | 1 | 29.4 | 15.2 |
| (4) #1 plus 0.5% dimethyl octadecylamine | 24 | 4 | 16.1 | 5.8 |
| (5) #1 plus 0.5% 1 hydroxyethyl, 2 heptadecenyl imidazoline | 18 | 3 | 2.9 | trace |
| (6) #1 plus 1.0% 1 hydroxyethyl, 2 heptadecenyl imidazoline | 20 | 3 | 2.6 | trace |
| (7) #1 plus 0.5% 1 hydroxyethyl, 2 heptadecyl imidazoline | 21 | 2 | 2.8 | trace |
| (8) #1 plus 0.5% alkyl¹ amido propylene diamine | 20 | 2 | 3.3 | trace |
| (9) #1 plus 0.75% alkyl¹ amido propylene diamine | 19 | 3 | 2.4 | none |
| (10) #1 plus 0.5% alkyl¹ amido dipropylene triamine | 22 | 4 | 3.2 | trace |

¹ Alkyl group is from linoleic-oleic acids derived from tall oil.

The emulsion was treated with 0.45% oleic acid and 1.5% lime to form a calcium oleate soap and found to have a high fluid loss and a loose emulsion as is evidenced by the free water in the filtrate. A further addition of 0.45% oleic acid did not improve the emulsion. Addition of 0.5% octadecyl amine, or dimethyl octadecyl amine loosened the emulsion and raised the fluid loss.

However, addition of 0.5% of 1 hydroxyethyl, 2 heptadecenyl imidazoline or 1 hydroxyethyl, 2 heptadecyl imidazoline or alkyl amido propylene diamine or alkyl amido dipropylene triamine, each markedly reduced viscosity and fluid loss and greatly tightened the emulsion resulting in clean milky white fluids. Barites did not settle in any of the fluids tested. The alkyl group in the diamine or triamine used was derived from oleic-linoleic acids from tall oil fractionation.

An addition of 0.5% more of 1 hydroxyethyl, 2 heptadecenyl imidazoline (Table 1) had very little effect on viscosity and gelation of the fluid containing 0.5% of the amine, but did reduce the fluid loss slightly. Similarly, an addition of 0.25% more of alkyl amido propylene diamine had little effect on viscosity and gelation but did lower the fluid loss and tighten the emulsion. This tendency of the emulsion to remain constant in rheological properties with increasing amounts of amine is a desirable feature, inasmuch as overtreatments, whether accidental or deliberate, will not overthin the emulsion or radically change it.

Dry bentonite fragments placed in the emulsions and agitated for two hours at 150 deg. F. were moistened by emulsions of tests 1 to 4 inclusive, and remained dry in emulsions of tests 5 to 10 inclusive, where the special types of amines were present.

It is evident that the two imidazolines, containing a long chain alkyl group and the amido diamine and amido triamine containing a long chain alkyl group, all were very effective in reducing viscosity and fluid loss and in stabilizing the calcium oleate emulsion, while the long chain primary and tertiary monamines actually impaired the emulsion and raised the fluid loss.

*Example 2*

To illustrate some of the various metallic soaps that may be used in connection with the special amine, a fluid was made up containing 54% diesel fuel and 46% water. It was weighted with 40 lb./bbl. barites, to evaluate its suspending power, and treated with 0.75% alkyl amido propylene diamine (alkyl from oleic linoleic acids) and 1½% lime.

| Mud Composition | At 120 Deg. F. | | 30 Min. Fluid Loss at 100 p.s.i. and 190 Deg. F. | |
|---|---|---|---|---|
| | Viscosity, cp. | 10 Min. Gel, g. | Total ml. | Free Water, ml. |
| (1) 54% diesel fuel, 46% water, 40 lb./bbl. barites, 0.75% alkyl¹ amido propylene diamine and 1.5% lime | 16 | 1 | 15.5 | 3.0 |
| (2) #1 plus 0.45% oleic acid | 19 | 3 | 2.4 | none |
| (3) #1 plus 0.45% distilled tall oil, fatty and rosin acids | 20 | 4 | 2.9 | trace |
| (4) #1 plus 0.45% myristic acid | 20 | 2 | 3.9 | trace |
| (5) #1 plus 0.45% naphthenic acid | 17 | 1 | 4.9 | 0.5 |
| (6) #1 plus 0.9% naphthenic acid | 23 | 1 | 3.9 | trace |
| (7) #1 plus 0.45% lecithin | 18 | 2 | 3.5 | trace |
| (8) As (2) but magnesium oxide substituted for lime | 16 | 2 | 2.8 | trace |

¹ Alkyl group is from linoleic-oleic acids derived from tall oil.

Where no acidic material was present the fluid loss was high and the emulsion quite loose as is evidenced by water in the filtrate. Addition of 0.45% lecithin, or oleic, myristic, naphthenic or tall oil acids all markedly reduced fluid loss and greatly tightened the emulsion, thus demonstrating the effectiveness of the calcium soaps of these acidic compounds when used with this special class of amine. Barites did not settle from any of the emulsions containing the acids. Despite the presence of 0.5 ml. of water in the filtrate of the emulsion of test 5, containing the calcium naphthenate soap, this emulsion did not cause swelling of bentonite fragments placed in it and agitated for 2 hours at 150 deg. F. When the naphthenic acid concentration was increased to 0.9% (test 6) the fluid loss was further improved and the emulsion tightened. The magnesium oleate soap of test 8 produced about as stable emulsion as the calcium oleate.

*Example 3*

A water-in-oil emulsion containing 56% diesel fuel and 44% water was weighted with 40 lb./bbl. finely divided calcium carbonate. It was treated with 0.5% 1 hydroxyethyl, 2 heptadecenyl imidazoline and 0.6% ferric stearate. No lime was added. At 120 deg. F. it had a viscosity of 24 cp. and a 10 minute gel of 5 grams at 100 p.s.i. and 190 deg. F. it had a 30 minute fluid loss of 3.6 ml. with 0.5 ml. water in the filtrate.

*Example 4*

A water-in-oil emulsion containing 35% diesel fuel and 65% of a 4% salt water solution was treated with 0.2% of oleic acid, 2.5% of alkyl amido propylene diamine (alkyl from oleic-linoleic acids) and 2% lime. The emulsion at 120 deg. F. had a viscosity of 58 cp. and a 10 minute gel of 4 grams. At 100 p.s.i. and 190 deg. F. its 30 minute fluid loss was 1.0 ml. with no free water present in the filtrate.

*Example 5*

To illustrate the use of alkali metal soaps, an emulsion drilling fluid was prepared containing 46% of a 10 percent salt water solution in diesel fuel. It was weighted with 40 lb./bbl. barites and treated with 0.6% sodium linoleate soap. At 120 deg. F. the viscosity was 17 cp. and the 10 minute gel was 2 grams. At 190 deg. F. and 100 p.s.i. the 30-minute fluid loss was 7.4 ml. with 3.1 ml. free water in the filtrate. Upon treatment with 0.5% alkyl amido propylene diamine (alkyl from linoleic-oleic acids) the viscosity and gel strength were unchanged, but the fluid loss was reduced to 1.5 ml., with no water in the filtrate. Barites did not settle in this emulsion.

*Example 6*

An emulsion was prepared containing 46% of a 4% calcium chloride solution in diesel fuel. It contained 0.8% alkyl amido propylene diamine (alkyl from linoleic-oleic acids), 0.45% oleic acid and 1½% lime. At 120 deg. F. it had a viscosity of 25 cp. and a 10 minute gel of 4 grams. At 100 p.s.i. and 190 deg. F. its 30 minute fluid loss was 2.5 ml. with only a trace of water in the filtrate.

*Example 7*

A water-in-oil drilling fluid containing 44% water and 56% diesel oil was made up by addition of 0.5% Dresinate–731 (Hercules Powder Co.), 0.1% ferric chloride and 2½% lime, in a manner prescribed in my patent, U.S. 2, 754, 265. Dresinate–731 is a partially saponified disproportionated resin. As the surfactants present were unable to adequately emulsify the water, the 30-minute fluid loss at 100 p.s.i. and 190 deg. F. was high, namely 18.5 ml., and the filtrate contained 5.6 ml. water. At 120 deg. F. the viscosity was 32 cp. and the 10 minute gel was 38 grams.

On treatment with 0.5% alkyl amido propylene diamine (alkyl from oleic-linoleic acids) the viscosity and 10 minute gel were reduced to 15 cp. and 3 grams, respectively, and the fluid loss was reduced to 2.9 ml., with no water in the filtrate.

*Example 8*

A water-in-oil emulsion was prepared using 20% of a 4% salt water solution in a 23 deg. API California crude oil from the Kraemer Field. The fluid was treated with 0.3% alkyl amido propylene diamine (alkyl from oleic-linoleic acids) and 1½% lime. Since the crude oil contained natural acids, no acidic material was added to the fluid. At 120 deg. F. the viscosity was 42 cp. and the 10 minute gel was 1 gram. At 100 p.s.i. and 190 deg. F. the 30 minute fluid loss was 0.4 ml. with no water in the filtrate.

Having described in considerable detail various embodiments of my invention, I do not wish to be limited by such examples but rather only by the claims.

What is claimed is:

1. A stable water-in-oil emulsion drilling and fracturing fluid comprising 10% to 70% of an aqueous phase dispersed in mineral oil, 0.2 to 5% of a metallic soap derived from a class of oil soluble organic acids consisting of fatty, rosin, naphthenic and phosphatides; and, 0.1 to 5% of an amine having a molecular weight greater than 200 and containing at least one aliphatic chain of at least twelve carbon atoms in length, selected from a class of aliphatic amido diamines, aliphatic amido polyamines, and aliphatic heterocyclic amines containing 2 nitrogen atoms in the ring structure.

2. A drilling and fracturing fluid according to claim 1 wherein the amine is an aliphatic imidazoline.

3. A drilling and fracturing fluid according to claim 1 wherein the aqueous phase contains at least one electrolytic salt.

4. A drilling and fracturing fluid according to claim 1 containing also solids in suspension.

5. A drilling and fracturing fluid according to claim 1 containing also an alkaline earth base.

6. In a method of servicing a well during drilling, fracturing, and completing operations, the step of circulating in said well a stable water-in-oil emulsion as set forth in claim 1.

7. A drilling and fracturing fluid according to claim 5 containing a calcium soap plus calcium hydroxide.

References Cited in the file of this patent

UNITED STATES PATENTS

| | | |
|---|---|---|
| 2,099,825 | Rolshausen et al. | Nov. 23, 1937 |
| 2,400,001 | Grupelli | May 7, 1946 |
| 2,497,398 | Dawson | Feb. 14, 1950 |
| 2,509,588 | Dawson | May 30, 1950 |
| 2,661,334 | Lummus | Dec. 1, 1953 |
| 2,667,457 | McChrystal | Jan. 26, 1954 |
| 2,675,353 | Dawson | Apr. 13, 1954 |
| 2,702,787 | Freeland | Feb. 22, 1955 |
| 2,779,734 | Buchanan et al. | Jan. 29, 1957 |
| 2,797,196 | Dunn et al. | June 25, 1957 |
| 2,802,531 | Cardwell et al. | Aug. 13, 1957 |
| 2,876,197 | Watkins | Mar. 3, 1959 |
| 2,946,746 | Keller | July 26, 1960 |

FOREIGN PATENTS

| | | |
|---|---|---|
| 337,368 | Great Britain | Oct. 27, 1930 |